(12) United States Patent
Russell

(10) Patent No.: US 8,059,931 B2
(45) Date of Patent: Nov. 15, 2011

(54) FIBER OPTIC MONITORING PATCH PANEL PROVIDING READILY ACCESSIBLE MONITORING PORTS

(75) Inventor: John B. Russell, San Jose, CA (US)

(73) Assignee: Realm Communications Group, Inc., Milpitas, CA (US)

(*) Notice: Subject to any disclaimer, the term of this patent is extended or adjusted under 35 U.S.C. 154(b) by 289 days.

(21) Appl. No.: 12/436,742

(22) Filed: May 6, 2009

(65) Prior Publication Data

US 2010/0027953 A1 Feb. 4, 2010

Related U.S. Application Data

(60) Provisional application No. 61/050,821, filed on May 6, 2008.

(51) Int. Cl.
*G02B 6/00* (2006.01)
(52) U.S. Cl. .......................... 385/135; 385/134
(58) Field of Classification Search .............. 385/134, 385/135
See application file for complete search history.

(56) References Cited

U.S. PATENT DOCUMENTS

| | | | |
|---|---|---|---|
| 6,263,136 B1 * | 7/2001 | Jennings et al. | 385/48 |
| 6,310,860 B1 * | 10/2001 | Sheu et al. | 370/252 |
| 6,445,865 B1 * | 9/2002 | Janus et al. | 385/135 |
| 6,728,461 B1 * | 4/2004 | Senatore et al. | 385/135 |
| 7,245,587 B2 * | 7/2007 | Phaal | 370/244 |
| 7,302,153 B2 * | 11/2007 | Thom | 385/135 |
| 7,483,383 B2 * | 1/2009 | Santoso et al. | 370/244 |
| 7,570,861 B2 * | 8/2009 | Smrha et al. | 385/135 |
| 7,889,962 B2 * | 2/2011 | Nair et al. | 385/135 |
| 2002/0075809 A1 * | 6/2002 | Phaal | 370/245 |
| 2006/0104591 A1 * | 5/2006 | Weinert et al. | 385/137 |
| 2009/0080338 A1 * | 3/2009 | Parker et al. | 370/250 |
| 2010/0172622 A1 * | 7/2010 | Reagan et al. | 385/135 |

* cited by examiner

*Primary Examiner* — Rhonda Peace

(74) *Attorney, Agent, or Firm* — Silicon Valley Patent Group LLP

(57) ABSTRACT

A patch panel includes a rackmount cabinet, front and rear doors, a stepped front panel, and provision for inserting and securing a plurality of coupler cartridges. The stepped front panel has a recessed first portion and a second portion, where the second portion extends farther in a forward direction, e.g., towards the front door, than the recessed first portion. Traffic ports are positioned at the recessed first portion of the stepped front panel and monitor ports are positioned at the second portion of the front panel so that communication traffic cables inserted in the traffic ports are isolated from the monitoring ports. The communication traffic cables may be held in a cable management area that is at least partially defined by the recessed portion of the stepped front panel.

16 Claims, 3 Drawing Sheets

FIBER OPTIC MONITORING PATCH PANEL PROVIDING READILY ACCESSIBLE MONITORING PORTS

CROSS-REFERENCE TO RELATED APPLICATIONS

The present application claims the benefit of U.S. application Ser. No. 61/050,821, filed on May 6, 2008, which is incorporated by reference herein.

BACKGROUND

Current patch panels with monitoring ports place the communication traffic cables in the same physical space as the monitoring ports. In use, a technician needs to access the monitoring ports to connect a monitor cable.

SUMMARY

A patch panel includes a rackmount cabinet, front and rear doors, a stepped front panel, and provision for inserting and securing a plurality of coupler cartridges. The stepped front panel has a recessed first portion and a second portion, where the second portion extends farther in a forward direction, e.g., towards the front door, than the recessed first portion. Traffic ports are positioned at the recessed first portion of the stepped front panel and monitor ports are positioned at the second portion of the front panel so that communication traffic cables inserted in the traffic ports are isolated from the monitoring ports. The communication traffic cables may be held in a cable management area that is at least partially defined by the recessed portion of the stepped front panel.

DETAILED DESCRIPTION

Figure 1:
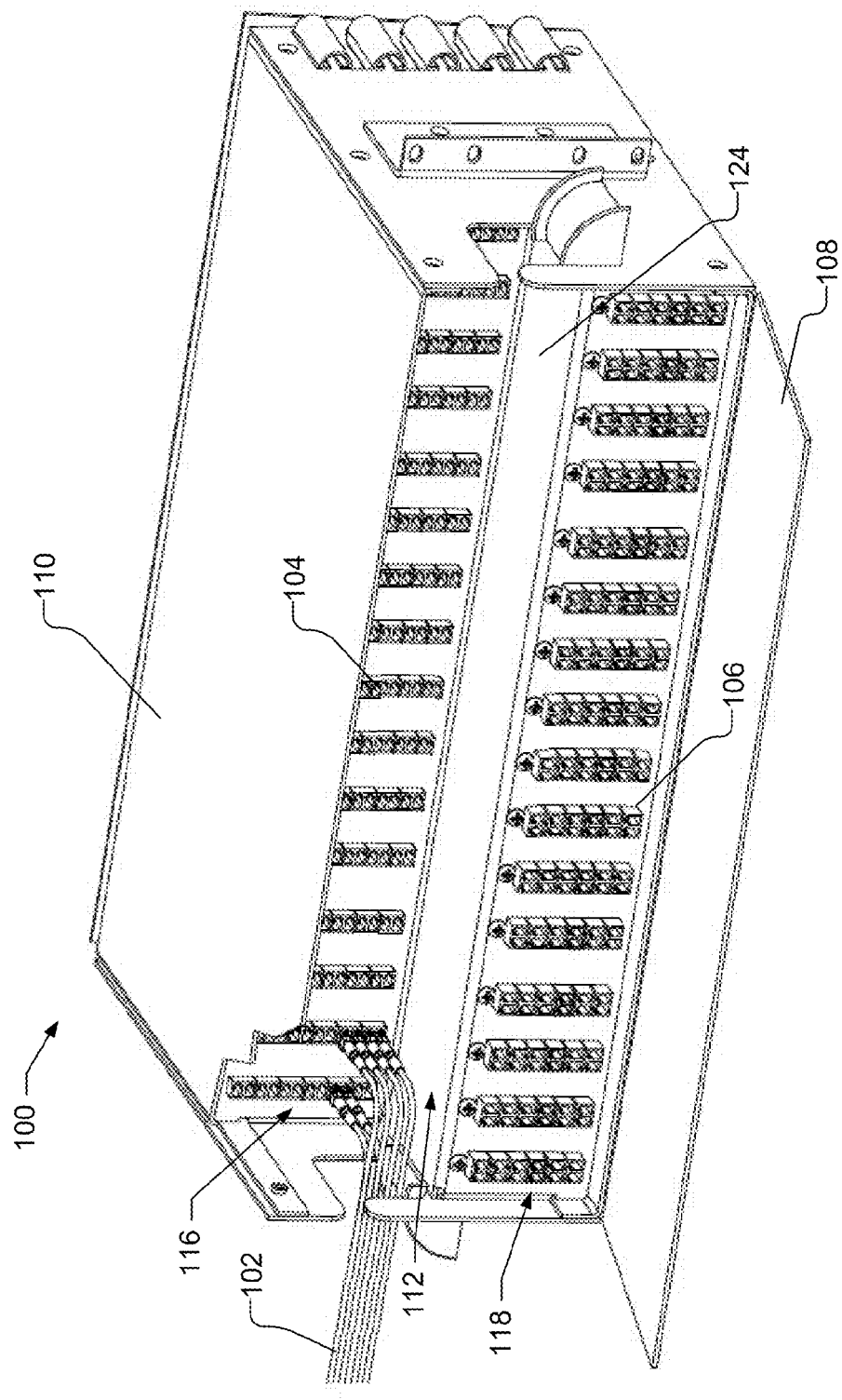
FIG. 1 is a perspective view of a patch panel having a stepped front panel that isolates the communication traffic cables from the monitoring ports.
Figure 2:
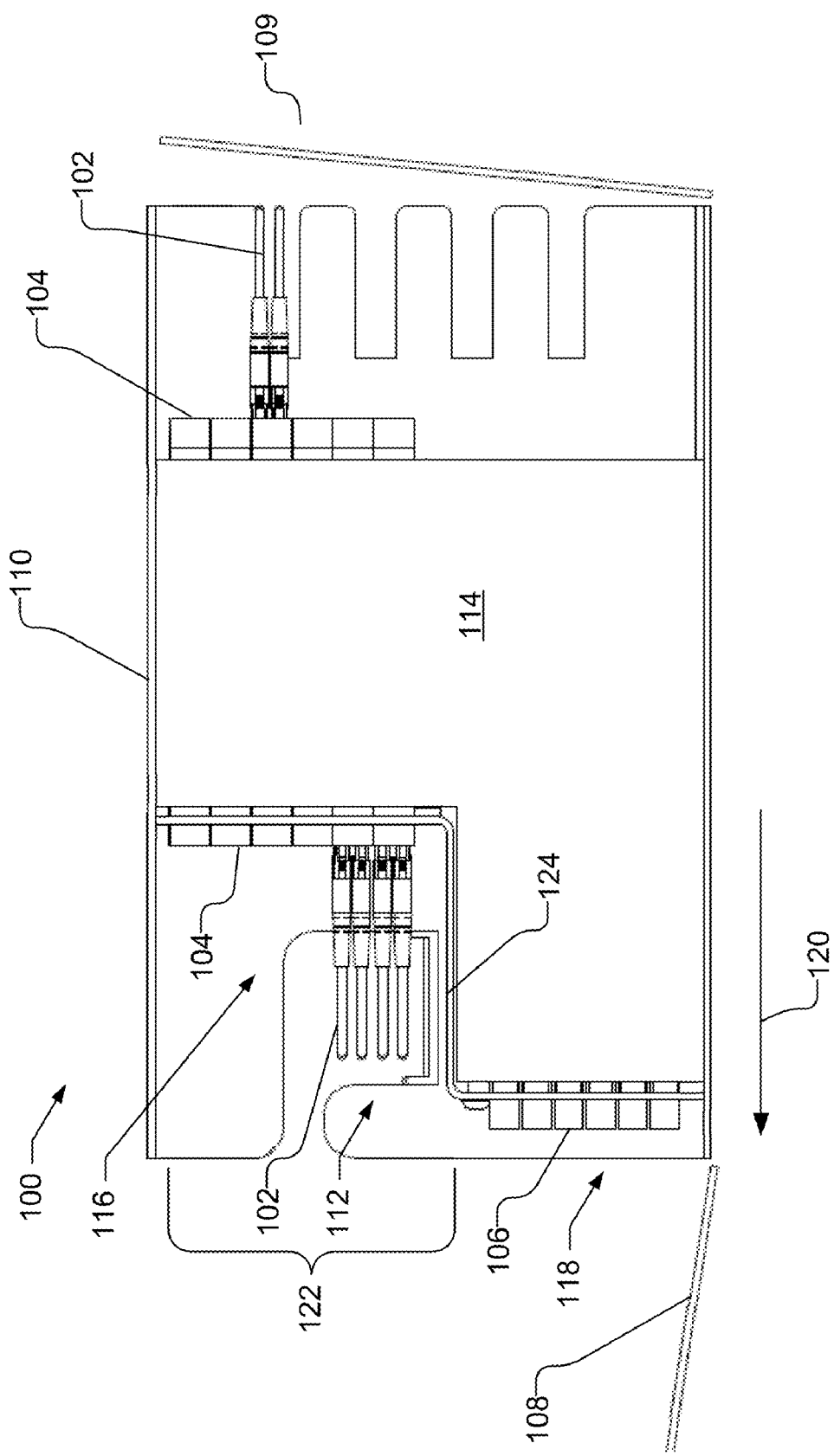
FIG. 2 is a cut-away side view of the patch panel from FIG. 1.

FIGS. 1 and 2 show partially cut-away perspective and cut-away side views, respectively, of a patch panel 100 that keeps the communication traffic cables 108 physically isolated from the monitoring ports 106. By moving the monitoring ports 106 forward with respect to the traffic ports 104, there is more space inside the patch panel 100, allowing for more ports 104, 106 to be accommodated within the same sized cabinet. Since the monitoring ports 106 only have cables (not shown) connected during active monitoring, it is not necessary to be able to close the patch panel cabinet door 108 with the monitor cable connected. In one embodiment, there is a direct one-to-one correspondence between the traffic port pairs 104 and the corresponding monitoring port pairs 108, assuring simple identification of the correct port 108 for the connection of the monitoring cable.

The patch panel 100 may be used, e.g., in telecommunications central offices to allow convenient monitoring of live telecommunications traffic for the purposes of troubleshooting and maintenance.

As illustrated in FIGS. 1 and 2, the fiber optic monitoring patch panel 100 consists of a rackmount cabinet 110, front and rear doors 108, 109, a stepped front panel 112, and provision for inserting and securing a plurality of coupler cartridges 114. The stepped front panel 112 has a recessed first portion 116 and a second portion 118, where the second portion 118 extends farther in a forward direction (illustrated by arrow 120 in FIG. 2), e.g., towards the front door 108, than the recessed first portion 116. A plurality of traffic ports 104 configured to receive fiber optic cables 102 is positioned at the recessed first portion 116 of the stepped front panel 112 and a plurality of monitor ports 106 configured to receive fiber optic cables is positioned on the second portion 118 of the front panel 112. The recessed first portion 116 of the stepped front panel 112 at least partially defines a cable management area 122, show in FIG. 2, that is sufficiently large that fiber optic cables 102 inserted in the traffic ports 104 are contained within the cable management area 122. For example, the fiber optic cables 122 inserted in the traffic ports 104 may be contained within the cable management area 122 so that they do not extend forward farther than the second portion 118 of the stepped front panel 112. The stepped front panel 112 may further include a shelf 124 for the communication traffic cables 102. The shelf 124 may also partially define the cable management area 122.

Figure 3:
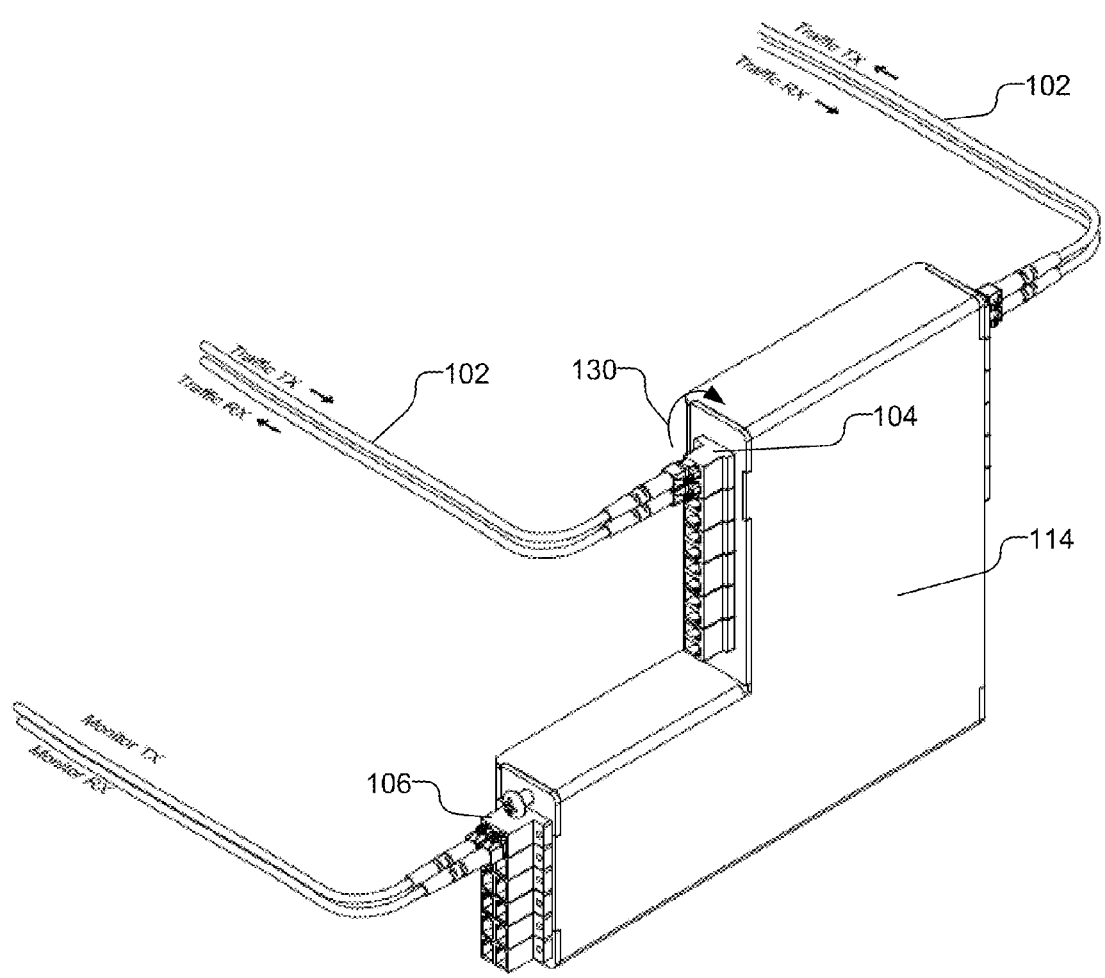
FIG. 3 is a perspective view of a coupler cartridge that may be used with the patch panel of FIG. 1.

FIG. 3 illustrates a perspective view of a coupler cartridge 114. The coupler cartridges 114 contain the fiber optic couplers and connectors necessary to effect traffic connections 104 and monitoring ports 106. As illustrated in FIG. 3, the plurality of traffic ports 104 and the plurality of monitor ports 106 face the same general direction, but the plurality of traffic ports 104 are rotated 90 degrees, illustrated by arrow 130, with respect to the plurality of monitor ports 106. In the event that maintenance, repair, or upgrading is required, the coupler cartridges 114 can be removed and replaced individually.

In one embodiment, the rackmount cabinet 110 is a standard size 4U (7" tall) 23" rackmount, containing 16 coupler cartridges 114, where each coupler cartridge 114 provides monitoring ports 106 for 6 pair of communication traffic channels 104. The cabinet 110 and cartridges 114 would typically be made of formed sheet metal.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A patch panel comprising:
   a stepped front panel having a recessed first portion and a second portion, the second portion extending farther in a forward direction than the recessed first portion;
   a plurality of traffic ports configured to receive fiber optic cables, the traffic ports positioned at the recessed first portion of the stepped front panel, wherein the recessed first portion of the stepped front panel at least partially defines a cable management area that is sufficiently large that fiber optic cables inserted in the traffic ports are contained within the cable management area and do not extend forward farther than the second portion of the stepped front panel; and
   a plurality of monitor ports configured to receive fiber optic cables, the monitor ports positioned at the second portion of the stepped front panel.

2. A patch panel of claim 1, wherein the plurality of traffic ports and the plurality of monitor ports face the same direction and are linearly arranged along the same direction, wherein each one of the plurality of traffic ports is oriented 90 degrees to each one of the plurality of monitor ports.

3. The patch panel of claim 1, further comprising a plurality of coupler cartridges, each coupler cartridge including a first plurality of fiber optic couplers that serve as the traffic ports and a second plurality of fiber optic couplers that serve as the monitor ports.

4. The patch panel of claim 3, wherein the second plurality of fiber optic couplers that serve as the monitor ports extend farther in a forward direction than the first plurality of fiber optic couplers that serve as the traffic ports.

5. The patch panel of claim 1, further comprising a shelf that is perpendicular to and between the plurality of traffic ports and the plurality of monitor ports, the shelf also defines the cable management area.

6. The patch panel of claim 1, further comprising a front cabinet door that can be closed when the fiber optic cables are inserted in the traffic ports and cannot be closed when fiber optic cables are inserted in the monitor ports.

7. The patch panel of claim 1, wherein the recessed first portion of the stepped front panel is above the second portion of the stepped front panel.

8. A patch panel comprising:
a stepped front panel having a recessed first portion and a second portion, the second portion extending farther in a forward direction than the recessed first portion; and
at least one coupler cartridge coupled to the stepped front panel, the at least one coupler cartridge comprising a plurality of traffic ports positioned at the recessed first portion of the stepped front panel and a plurality of monitor ports positioned at the second portion of the stepped front panel.

9. The patch panel of claim 8, further comprising a plurality of coupler cartridges coupled to the stepped front panel, wherein the plurality of traffic ports and the plurality of monitor ports for each coupler cartridge face the same direction and are linearly arranged along the same direction, wherein each one of the plurality of traffic ports is oriented 90 degrees to each one of the plurality of monitor ports.

10. The patch panel of claim 8, wherein the recessed first portion of the stepped front panel is above the second portion of the stepped front panel.

11. The patch panel of claim 8, further comprising a front cabinet door that can be closed when fiber optic cables are inserted in the traffic ports and cannot be closed when fiber optic cables are inserted in the monitor ports.

12. The patch panel of claim 8, further comprising a shelf between the recessed first portion and the second portion of the stepped front panel, the shelf extending in the forward direction.

13. The patch panel of claim 12, further comprising a cable management area defined by the recessed first portion of the stepped front panel and the shelf, the cable management area being sufficiently large that fiber optic cables inserted in the traffic ports in the recessed first portion are contained within the cable management area and do not extend forward farther than the second portion of the stepped front panel.

14. An apparatus comprising:
a patch panel coupler cartridge comprising:
a plurality of traffic ports, the traffic ports being linearly arranged; and
a plurality of monitor ports that face the same direction as the traffic ports, the monitor ports being linearly arranged in the same direction as the plurality of traffic ports, the plurality of monitor ports are located farther forward than the plurality of traffic ports in a direction faced by the plurality of traffic ports and the plurality of monitor ports.

15. The apparatus of claim 14, wherein the patch panel coupler cartridge is stepped with a recessed portion and a non-recessed portion, the plurality of traffic ports are located on the recessed portion and the plurality of monitor ports are located on the non-recessed portion.

16. A patch panel coupler cartridge comprising:
a plurality of traffic ports, the traffic ports being linearly arranged; and
a plurality of monitor ports that face the same direction as the traffic ports, the monitor ports being linearly arranged in the same direction as the plurality of traffic ports, the plurality of monitor ports are located farther forward than the plurality of traffic ports, wherein each one of the plurality of traffic ports is oriented 90 degrees to each one of the plurality of monitor ports.

* * * * *